United States Patent
Hathorn

(10) Patent No.: US 9,584,554 B2
(45) Date of Patent: *Feb. 28, 2017

(54) GATEWAY DEVICE TO CONNECT NATIVE FIBRE CHANNEL PORTS TO PURE FIBRE CHANNEL OVER ETHERNET STORAGE AREA NETWORKS

(71) Applicant: INTERNATIONAL BUSINESS MACHINES CORPORATION, Armonk, NY (US)

(72) Inventor: Roger G. Hathorn, Tucson, AZ (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/811,518

(22) Filed: Jul. 28, 2015

(65) Prior Publication Data
US 2015/0334134 A1 Nov. 19, 2015

Related U.S. Application Data

(63) Continuation of application No. 13/534,086, filed on Jun. 27, 2012, now Pat. No. 9,143,567.

(51) Int. Cl.
  *H04L 29/06* (2006.01)
  *H04L 29/08* (2006.01)
  *H04L 12/02* (2006.01)

(52) U.S. Cl.
  CPC ...... *H04L 65/1033* (2013.01); *H04L 67/1097* (2013.01); *H04L 69/08* (2013.01); *H04L 12/02* (2013.01); *H04L 67/2842* (2013.01)

(58) Field of Classification Search
  None
  See application file for complete search history.

(56) References Cited

U.S. PATENT DOCUMENTS

7,599,397 B2 * 10/2009 Holland .............. H04L 67/1097
  370/475
7,804,840 B2  9/2010 Rupanagunta et al.
  (Continued)

FOREIGN PATENT DOCUMENTS

CN  101820358 A  9/2010
CN  102045248 A  5/2011

OTHER PUBLICATIONS

Tate et al., "IBM Converged Switch B32," Redbooks, IBM, Apr. 2011 (200 pages).

*Primary Examiner* — Anh Ngoc Nguyen
(74) *Attorney, Agent, or Firm* — Griffiths & Seaton PLLC

(57) ABSTRACT

A gateway device for use between a Fiber Channel over Ethernet (FCoE) network and a Fiber Channel (FC) storage area network (SAN) device includes a controller, at least one first native Fiber Channel F_Port in operable communication with the controller and configured to interface with a native Fiber Channel N_Port of the FC SAN device, and at least one first virtual N_Port (VN_Port) linked to the at least one first native Fiber Channel F_Port and in operable communication with the controller; the controller being configured to translate a first FC Fabric Login (FLOGI) received by the at least one first native Fiber Channel F_Port into a FIP N_Port ID Virtualization (NPIV) discover service fabric parameter (FDISC) and to send the FIP NPIV FDISC to an FCF to instantiate a virtual link.

22 Claims, 3 Drawing Sheets

(56) References Cited

U.S. PATENT DOCUMENTS

| | | |
|---|---|---|
| 8,108,454 B2 | 1/2012 | Snively et al. |
| 8,284,785 B2 | 10/2012 | Hirata |
| 8,514,856 B1 | 8/2013 | Gai et al. |
| 2009/0161692 A1 | 6/2009 | Hirata et al. |
| 2009/0245791 A1 | 10/2009 | Thaler et al. |
| 2009/0292813 A1 | 11/2009 | Snively et al. |
| 2010/0115132 A1* | 5/2010 | Hirata .................. H04L 12/413 709/245 |
| 2010/0165994 A1 | 7/2010 | Narayanaswamy et al. |
| 2010/0214950 A1 | 8/2010 | Vobbilisetty |
| 2010/0232419 A1 | 9/2010 | Rivers |
| 2011/0044344 A1 | 2/2011 | Hudson et al. |
| 2011/0064086 A1 | 3/2011 | Xiong et al. |
| 2011/0188511 A1 | 8/2011 | Di Benedetto |
| 2011/0280572 A1 | 11/2011 | Vobbilisetty et al. |
| 2011/0299539 A1 | 12/2011 | Rajagopal et al. |
| 2012/0039163 A1 | 2/2012 | Nakajima |
| 2012/0155469 A1 | 6/2012 | Majumdar et al. |
| 2012/0195188 A1 | 8/2012 | Zhang |
| 2012/0275316 A1 | 11/2012 | Wang |
| 2013/0148546 A1 | 6/2013 | Eisenhauer et al. |
| 2013/0148663 A1 | 6/2013 | Xiong |

\* cited by examiner

US 9,584,554 B2

GATEWAY DEVICE TO CONNECT NATIVE FIBRE CHANNEL PORTS TO PURE FIBRE CHANNEL OVER ETHERNET STORAGE AREA NETWORKS

CROSS REFERENCE TO RELATED APPLICATIONS

This application is a Continuation of U.S. patent application Ser. No. 13/534,086, filed on Jun. 27, 2012.

BACKGROUND OF THE INVENTION

Field of the Invention

The present invention relates in general to gateway devices, and more particularly, to gateway devices for use with Fibre Channel and Fibre Channel over Ethernet devices.

Description of the Related Art

Fibre Channel is a high reliability, high speed network technology that is often used in storage networking, particularly in storage area network (SAN) environments. Many data centers use Fibre Channel (FC) for storage networking, and, in conjunction, use Ethernet for TCP/IP networks. As a result, the data center has two separate networks to maintain. FCoE is a network protocol that encapsulates Fibre Channel frames in Ethernet frames in order to allow Fibre Channel to be used over an Ethernet infrastructure. FCoE thus allows storage traffic generated according to the FC protocol to share infrastructure with network traffic generated according to Ethernet protocols such as TCP/IP.

SUMMARY OF THE INVENTION

Various embodiments are provided for a gateway device for use between a Fibre Channel over Ethernet (FCoE) network and a Fibre Channel (FC) storage area network (SAN) device including a controller, at least one first native Fibre Channel F_Port in operable communication with the controller and configured to interface with a native Fibre Channel N_Port of the FC SAN device, and at least one first virtual N_Port (VN_Port) linked to the at least one first native Fibre Channel F_Port and in operable communication with the controller; the controller being configured to translate a first FC Fabric Login (FLOGI) received by the at least one first native Fibre Channel F_Port into a FIP N_Port ID Virtualization (NPIV) discover service fabric parameter (FDISC) and to send the FIP NPIV FDISC to an FCF to instantiate a virtual link.

In addition to the foregoing exemplary embodiment, various other system and computer program product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

The illustrated embodiments below provide gateway devices for use between a Fibre Channel over Ethernet (FCoE) devices and Fibre Channel (FC) devices and a device in a storage area network (SAN). More particularly, the gateway device is configured to allow connectivity of a legacy Fibre Channel N-Port to a pure FCoE lossless Ethernet SAN device (e.g., a device with no FC ports). In this regard, the gateway device includes a controller, at least one first native Fibre Channel F_Port in operable communication with the controller and configured to interface with a native Fibre Channel N_Port of the SAN storage device, and at least one first virtual N_Port (VN_Port) linked to the at least one first native Fibre Channel F_Port and in operable communication with the controller and configured to interface with a VF_Port of an FCoE SAN. Methods and systems including the gateway device are also contemplated.

Figure 1:
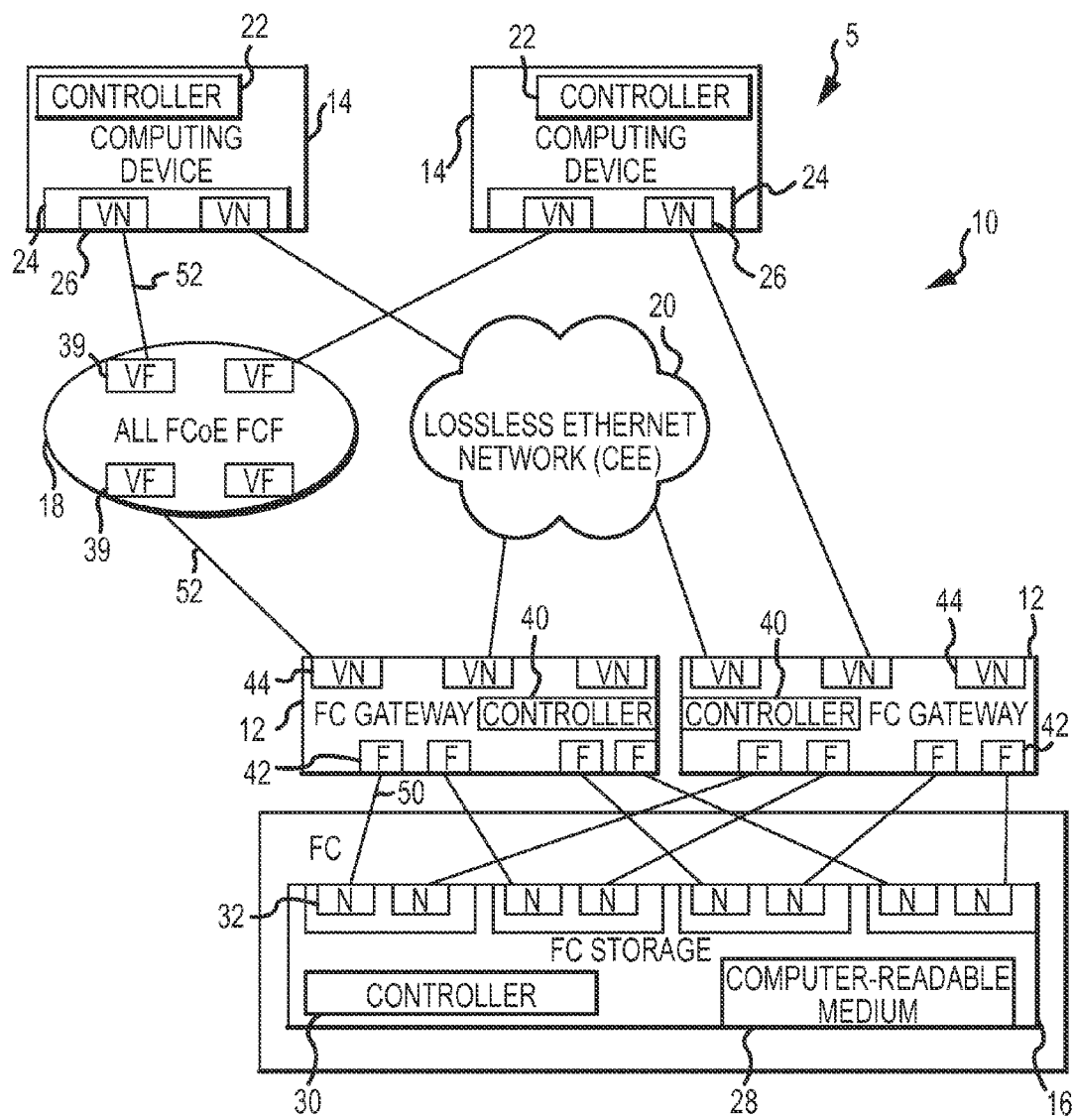
FIG. 1 illustrates a block diagram of a network system including a gateway device, according to an embodiment.

Turning to FIG. 1, a block diagram of a network system 10 including gateway devices 12 is illustrated. Network system 10 includes one or more computing devices 14 connected to a storage device 16 via one or more gateway devices 12. One or more of computing devices 14 are further linked to one or more gateway devices 12 through one or more FCoE Forwarders (FCF) 18 and/or a Lossless Ethernet Network (CEE) 20 containing at least one FCF. Computing devices 14 and FCF 18 and/or CEE 20 are included as part of one or more storage area networks (SAN). Each of these components will now be described below.

Computing devices 14 are configured to communicate data to storage device 16. In an embodiment, communication occurs using Fibre Channel over Ethernet (FCoE) protocols. In an embodiment, one or more of computing devices 14 are servers. Computing devices 14 each include controllers 22 having software and/or hardware elements configured to enable FC and FCoE communications and FC/FCoE components 24. FC/FCoE components 24 are configured to provide necessary functionality to enable FC communications over lossless Ethernet connections (e.g., to CEE 20) or over FCoE FCFs (e.g., FCF 18), and in this regard, include virtual N_Ports (VN_Port) 26 for such communications.

Storage device 16 includes a computer-readable storage medium 28, a controller 30, and one or more FC native N_Ports 32. Computer-readable storage medium 28 may be any type of computer-readable storage medium known in the art or developed in the future. For example, storage device 16 may comprise storage tape, an optical storage device, one or more disk storage devices (e.g., a RAID configuration, a JBOD configuration, etc.), and/or the like. In other embodiments, storage device 16 may include more than one computer-readable storage medium 28. In at least one of these embodiments, storage device 16 includes at least two different types of computer-readable storage media. Controller 30 may be any type of processor known in the art or developed in the future capable of performing input/output (I/O) operations on storage medium 28 via ports 32. Although FIG. 1 shows storage device 16 as including a single controller 30, various other embodiments of storage device 16 include more than one controller 30. FC native N_Ports 32 are capable of detecting SFP devices that are supported by each respective N_Port 32. According to FC protocol, each N_Port 32 is configured to be assigned to a single native fibre channel F_Port and to establish a link with that F_Port.

As noted previously, intervening components, such as FCFs 18 and/or CEE 20 may be included between gateway device 12 and computing devices 14. FCFs 18 are configured to forward translated FCoE frames over an enhanced Ethernet to devices of SAN 5 (e.g., computing devices 14). FCFs 18 include Ethernet ports, e.g., virtual F_Ports 39, which are virtually linked via virtual links 52 to corresponding VN_Ports 26 of computing devices 14. CEE 20 similarly includes FCFs (not shown), but presents VN_Ports 26 of devices 14 as ports thereon.

To allow FC N_Port 32 of storage device 16 to connect with a corresponding VN_Port 26 of computing devices 14, gateway device 12 is employed. Gateway device 12 includes a controller 40, one or more native Fibre Channel (FC) F_Ports 42, and one or more FCoE virtual N_Ports (VN_Ports) 44. Controller 40 resides in an E-Node of gateway device 12 and is configured to perform various discovery, initialization, and other FCoE protocols typically designated for a VN_Port capable MAC. Controller 40 may be any type of processor or processing portion of a device known in the art or developed in the future capable of performing input/output (I/O) operations on gateway device 12. FC F_Ports 42 are in operable communication with controller 40 and configured to interface with FC N_Port 32 of storage device 16 via physical links 50. Physical links 50 include, but are not limited to cables and other physical devices suitable for physically connecting two ports. In an embodiment, FC F_Ports 42 are adapted to virtualize the functionality of the F_Port in a FC switch as described by T11/FC-FS-2 and FC-SW-5 standards. VN_Ports 44 are in operable communication with controller 40 and are configured to be accessed by and to form virtual links 52 with VN_Ports 26 of computing device 14 or other VF_Ports (e.g., VF_Ports 39 of FCF 18).

Figure 2:
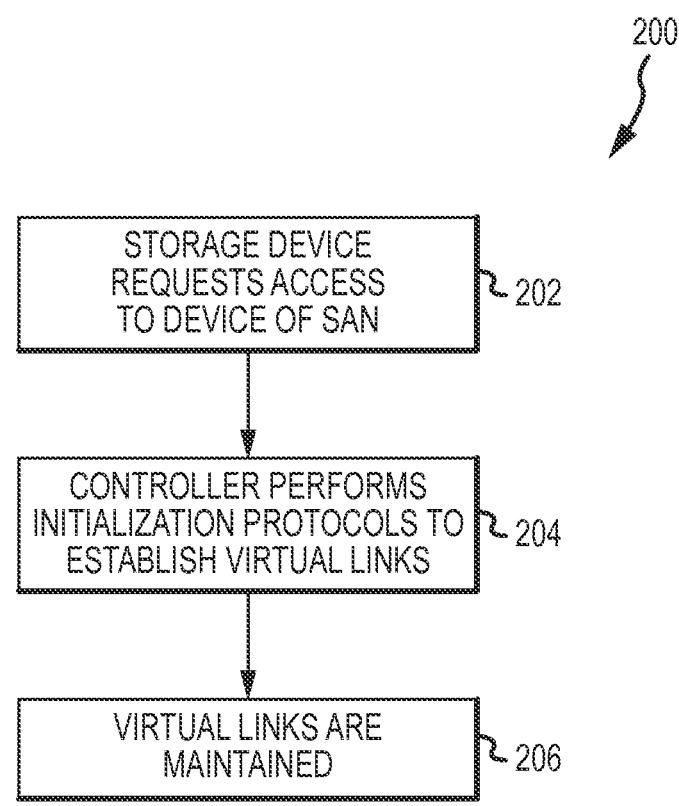
FIG. 2 illustrates a flow diagram of a method of operating network system of FIG. 1, according to an embodiment.

FIG. 2 is a flow diagram of a method 200 of operating system 10, according to an embodiment. During operation, storage device 16 may request access to device 14 of SAN 5 at 202. In order to do so, gateway device 12 initially is connected to storage device 16 such that each N_Port 32 of storage device 16 is linked via physical link 50 to a corresponding F_Port 42 on gateway device 12. Physical links 50 between N_Ports 32 and F_Ports 42 are established according to Fibre Channel protocols. As a result of linking gateway device 12 to storage device 16, VN_Ports 44 of gateway device 12 allows storage device 16 to appear to present native FCoE VN_Ports to SAN 5.

Controller 40 performs FCoE initialization protocols as required by the T11/FC-BB-5 standard for a VN_Port Capable MAC to establish virtual links 52 at 204. FCoE initialization protocols includes, but are not limited to virtual local area network (VLAN) discovery protocols, FCF discovery protocols, virtual link instantiation protocols, virtual link maintenance protocols, and other protocols. VLAN discovery protocols determine the VLANs for which FCoE protocols are supported. FCF discovery protocols are used to discover FCFs in the FCoE SAN. During VLAN Virtual Link Instantiation Protocols, controller 40 establishes virtual links 52 between VN_Ports 44 of gateway device 12 and one or more of CEE 20 and/or corresponding VF_Ports 39 of FCFs 18.

N_Port of 32 of each storage device 16 performs a Fabric Login (FLOGI) operation, the FC FLOGI request received by F_Port 42 is translated by controller 40 to a FIP FLOGI request and is sent on VN_Port 44 to a previously discovered FCF 18 (at 204) to instantiate FCoE virtual link 52 according to T11/FC-BB-5 standards. Alternatively, a FC FLOGI request received by F_Port 42 is translated to a FIP N_Port ID Virtualization (NPIV) discover service fabric parameters (FDISC) request and is sent on VN_Port 44 to a corresponding FCF 18 instantiating a virtual link, e.g., link 52. In an embodiment in which many FC IDs are requested using discover service fabric parameters (FDISC) requests, such requests are encapsulated into FIP requests and sent to FCFs 18. In an example, FC FDISC requests received by F_Port 42 are translated into FIP N_Port ID Virtualization (NPIV) discover service fabric parameters (FDISC) and are sent on VN_Port 44 to FCF 18, to establish another virtual link. When the FIP FLOGI or FIP FDISC request is accepted (e.g., FIP FLOGI LS_ACC or FIP FDISC LS_ACC), it is translated to a FC LS_ACC response with the FC ID assigned by FCF 18. F_Ports 42 are mapped to VN_Ports 44 via configuration (e.g., port to port or VLAN) mapping or by implementing load balancing algorithms with multiple paths to FCFs 18 on the same VLAN.

When virtual links 52 are established, any native FC frames received from storage device 16 by gateway device 18 (e.g., via F_Port 26) are encapsulated into FCoE frames and sent through VN_Ports 44 to FCFs 18. Any FCoE frames received on VN_Ports 44 are de-encapsulated and sent through F_Port 42 to storage device 16. Translation (i.e., encapsulation and/or de-capsulation) is performed according to known methods.

Virtual and physical links 52 and 50 are maintained at 206. FCoE controller 40 maintains virtual links 52 by implementing Virtual Link Maintenance Protocols as delineated in T11/FC-BB-5. Virtual Link Maintenance protocols include sending of VN_Port and E Node FIP Keep Alive messages to FCF 18 and monitoring reception of FIP Discovery Advertisements from FCF 18 to ensure communication between FCF 18 and the VN_Ports 44 on the gateway device is maintained.

If a failure of one or more of virtual link 52 between VN_Ports 44 and VF_Ports 39 is detected during link maintenance, such failure is reflected on F_Port 42 of gateway device 18 using FC primitive sequences. In particular, the FC primitive sequences indicate the operational state of the link e.g., not operational (NOS), offline (OLS), and the like. If a failure of one or more of physical links 50 is detected by F_Port 42 of gateway device 18, such failure is reflected to the FCoE virtual link 52 by sending a FIP encapsulated logout (LOGO) to the FCF for each of the currently established virtual links.

Figure 3:
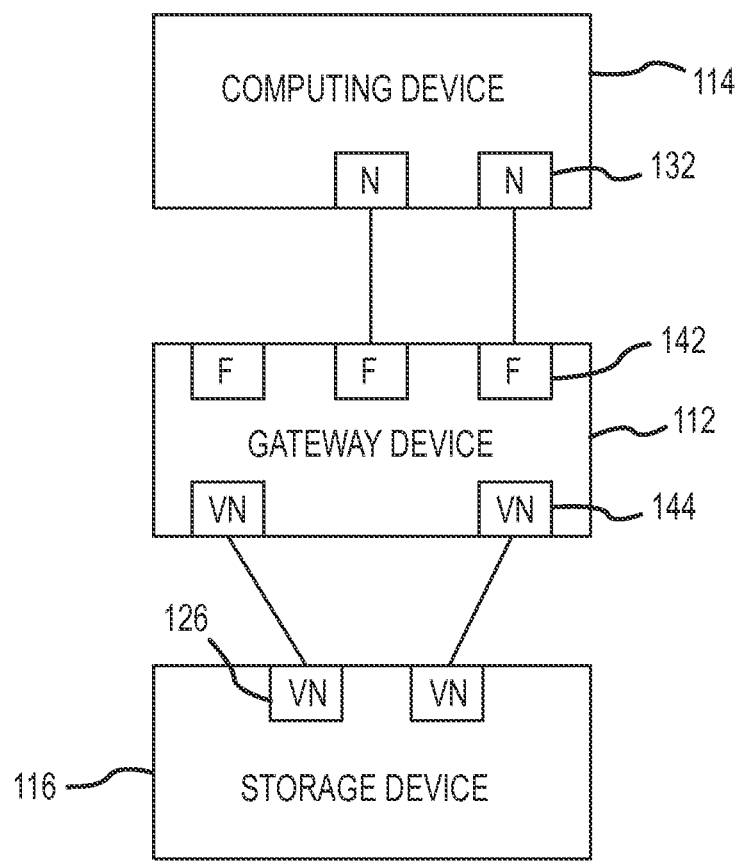
FIG. 3 illustrates an additional block diagram of a network system including a gateway device, according to an embodiment.

By employing gateway device 18 as described above, legacy Fibre Channel devices are able to connect to FCoE devices of a SAN. In particular, inclusion of both FC and Ethernet ports on a single gateway device provides multipoint connectivity between the legacy FC devices and FCoE devices of a SAN. Although computing devices 14 are described as communicating with storage devices 16 via FCoE protocols, FC protocols are employed in other embodiments. In an example, as shown in FIG. 3, computing devices 114, configured substantially similar to computing devices 14, alternatively are configured to communicate with storage devices 116, configured substantially similarly to storage devices 16, according to FC protocols, and devices 114 comprise FC servers or computing device while storage devices 116 comprise FCoE storage devices. In such a configuration, F_Ports 142, configured substantially similarly to F_Ports 42, on gateway device 112 (substantially similarly configured to device 12) communicate with N_Ports 132 (similar to N_Ports 32) of computing devices 114, VN_Ports 144 (similar to VN_Ports 44) of gateway device 112 are virtually linked to VN_Ports 126 (similar to VN_Ports 26) of storage device 114, and the basic operations and configurations described above continue to be applicable.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A gateway device for use between a Fibre Channel over Ethernet (FCoE) network and a Fibre Channel (FC) storage area network (SAN) device comprising:
   a controller;
   at least one first native Fibre Channel F_Port (FCF) in operable communication with the controller and configured to interface with a native Fibre Channel N_Port of the FC SAN device; and
   at least one first virtual N_Port (VN_Port) linked to the at least one first native Fibre Channel F_Port and in operable communication with the controller;
      wherein the controller is configured to translate a first FC Fabric Login (FLOGI) received by the at least one first native Fibre Channel F_Port into a FIP N_Port ID Virtualization (NPIV) discover service fabric parameter (FDISC) and to send the FIP NPIV FDISC to an FCF to instantiate a virtual link.

2. The gateway device of claim 1, wherein the at least one first VN_Port virtually links to at least one virtual F_Port (VF_Port).

3. The gateway device of claim 1, wherein the at least one first VN_Port virtually links with a lossless Ethernet network (CEE) having at least one FCoE forwarder (FCF).

4. The gateway device of claim 1, wherein the controller is configured to perform FCoE initialization protocols.

5. The gateway device of claim 4, wherein the FCoE initialization protocols comprise a VN_Port capable MAC protocol selected from a group consisting of virtual local area network (VLAN) discovery protocols, FCF discovery protocols, virtual link instantiation protocols, and virtual link maintenance protocols.

6. The gateway device of claim 1, wherein the controller is configured to perform a virtual link instantiation when a Fabric Login (FLOGI) is received from a Fibre Channel device.

7. The gateway device of claim 6, wherein the controller is configured to translate a first FC FLOGI received by the at least one first native Fibre Channel F_Port into a Fibre Channel Initiation Protocol Login (FIP FLOGI) and to send the FIP FLOGI to a discovered FCF.

8. The gateway device of claim 7, wherein the controller is further configured to translate an FC FDISC received by the at least one first native Fibre Channel F_Port into an FIP NPIV FDISC and to send the FIP NPIV FDISC on the at least one first virtual N_Port (VN_Port) to establish another virtual link.

9. A network system comprising:
   a Fibre Channel over Ethernet (FCoE) server including at least one first virtual N_Port (VN_Port);
   a Fibre Channel (FC) storage in operable communication with the FCoE server including at least one first native Fibre Channel N_Port; and
   a gateway device in communication with the FC storage including:
      a controller;
      at least one first native Fibre Channel F_Port (FCF) in operable communication with the controller and interfacing with the at least one first native Fibre Channel N_Port of the FC storage; and
      at least one second virtual N_Port (VN_Port) linked to the at least one first native Fibre Channel F_Port and in operable communication with the controller;
         wherein the controller is configured to translate a first FC Fabric Login (FLOGI) received by the at least one first native Fibre Channel F_Port into a FIP N_Port ID Virtualization (NPIV) discover service fabric parameter (FDISC) and to send the FIP NPIV FDISC to an FCF to instantiate a virtual link.

10. The network system of claim 9, further comprising a lossless Ethernet network (CEE) including at least one FCoE Forwarder (FCF) in operable communication with the at least one first VN_Port of the FCoE server and the at least one second VN_Port of the gateway device.

11. The network system of claim 9, further comprising a FCF including a first virtual F_Port (VF_Port) linking with the at least one first VN_Port of the FCoE server and a second VF_Port linking with the at least one second VN_Port of the gateway device.

12. The network system of claim 9, wherein the controller of the gateway device is configured to perform FCoE initialization protocols.

13. The gateway device of claim 12, wherein the FCoE initialization protocols comprise a VN_Port capable MAC protocol selected from a group consisting of virtual local area network (VLAN) discovery protocols, FCF discovery protocols, virtual link instantiation protocols, and virtual link maintenance protocols.

14. A method of connecting a native Fibre Channel port to a pure Fibre Channel over Ethernet (FCoE) Storage Area Network (SAN) comprising:
   providing a gateway device including a controller, at least one first native Fibre Channel F_Port (FCF) in operable communication with the controller and configured to interface with a native Fibre Channel N_Port of the SAN, and at least one first virtual N_Port (VN_Port) linked to the at least one first native Fibre Channel F_Port and in operable communication with the controller;
      wherein the controller is configured to translate a first FC Fabric Login (FLOGI) received by the at least one first native Fibre Channel F_Port into a FIP N_Port ID Virtualization (NPIV) discover service fabric parameter (FDISC) and to send the FIP NPIV FDISC to an FCF to instantiate a virtual link.

15. The method of claim 14, further comprising performing a virtual local area network discovery protocol.

16. The method of claim 15, further comprising performing a FCoE Forwarder (FCF) discovery protocol.

17. The method of claim 16, further comprising performing a Fabric Login (FLOGI) operation.

18. The method of claim 14, wherein performing the FLOGI operation includes performing a virtual link instantiation when FLOGI is received from a Fibre Channel device to establish a virtual link.

19. The method of claim 18, wherein performing the FLOGI operation includes translating an FC FDISC received by the at least one first native Fibre Channel F_Port into an FIP NPIV FDISC and sending the FIP NPIV FDISC on the at least one first virtual N_Port (VN_Port) to establish another virtual link.

20. The method of claim 19, further comprising performing virtual link maintenance on the established virtual link.

21. The method of claim 20, further comprising detecting a failure on the established virtual link and indicating the failure on the at least one first native Fibre Channel F_Port of the gateway device.

22. The method of claim 14, wherein performing the FLOGI operation includes translating a first Fibre Channel (FC) FLOGI received by the at least one first native Fibre Channel F_Port into a Fibre Channel Initiation Protocol (FIP) FLOGI and sending the FIP FLOGI to a discovered FCF via the at least one first virtual N_Port ($VN_{13}$ Port).

* * * * *